United States Patent
Tarasinski et al.

(10) Patent No.: US 10,662,023 B2
(45) Date of Patent: May 26, 2020

(54) ARRANGEMENT FOR DETERMINING A SPATIAL ORIENTATION OF A LINE PORTION UNWOUND FROM A CABLE DRUM

(71) Applicant: Deere & Company, Moline, IL (US)

(72) Inventors: Nicolai Tarasinski, Frankenthal (DE); Manfred Becker, Beindersheim (DE); Volker Kegel, Mannheim (DE); Julian Daubermann, Mannheim (DE)

(73) Assignee: Deere & Company, Moline, IL (US)

( * ) Notice: Subject to any disclaimer, the term of this patent is extended or adjusted under 35 U.S.C. 154(b) by 263 days.

(21) Appl. No.: 15/804,531

(22) Filed: Nov. 6, 2017

(65) Prior Publication Data

US 2018/0215573 A1 Aug. 2, 2018

(30) Foreign Application Priority Data

Jan. 31, 2017 (DE) .................... 10 2017 201 544

(51) Int. Cl.
| | |
|---|---|
| *G01B 7/30* | (2006.01) |
| *B65H 75/18* | (2006.01) |
| *H02G 1/06* | (2006.01) |
| *H02G 11/02* | (2006.01) |
| *B65H 75/42* | (2006.01) |
| *B65H 75/44* | (2006.01) |
| *B65H 57/26* | (2006.01) |

(Continued)

(52) U.S. Cl.
CPC ........... *B65H 75/182* (2013.01); *B65H 57/14* (2013.01); *B65H 57/26* (2013.01); *B65H 75/425* (2013.01); *B65H 75/4402* (2013.01); *B65H 75/4484* (2013.01); *G01D 5/16* (2013.01); *H02G 1/06* (2013.01); *H02G 11/02* (2013.01); *B65H 2701/34* (2013.01); *G01B 7/30* (2013.01)

(58) Field of Classification Search
CPC ............. G01D 5/165; G01D 5/16; G01B 7/30
USPC .......................................................... 33/551
See application file for complete search history.

(56) References Cited

U.S. PATENT DOCUMENTS

| | | | | |
|---|---|---|---|---|
| 3,255,531 | A * | 6/1966 | Anderson | G01B 3/1041 33/765 |
| 4,475,163 | A * | 10/1984 | Chandler | B66D 1/505 377/17 |

(Continued)

FOREIGN PATENT DOCUMENTS

| | | |
|---|---|---|
| DE | 1790108 A | 1/1972 |
| DE | 4429268 A1 | 2/1996 |

(Continued)

OTHER PUBLICATIONS

German Search Report issued in counterpart application No. 10 2017 201 544.6 dated Nov. 6, 2017 (12 pages).

(Continued)

*Primary Examiner* — Yaritza Guadalupe-McCall

(57) ABSTRACT

An arrangement is provided for determining a spatial orientation of a line portion unrolled from a cable drum. The arrangement includes a fastening base and a measuring probe having a cable guide and being pivotable in relation to the fastening base about a first and second axes of rotation. The measuring probe is configured to interact with a sensor device, and the sensor device is configured to sense the first and second axes of rotation.

22 Claims, 2 Drawing Sheets

(51) Int. Cl.
*B65H 57/14* (2006.01)
*G01D 5/16* (2006.01)

(56) References Cited

U.S. PATENT DOCUMENTS

| | | | |
|---|---|---|---|
| 7,395,609 B2* | 7/2008 | Powell | G01B 5/008 |
| | | | 33/1 N |
| 7,665,223 B2* | 2/2010 | Swanson | E04F 21/0076 |
| | | | 33/756 |
| 8,161,660 B2* | 4/2012 | Swanson | E04F 21/0076 |
| | | | 33/756 |
| 9,846,021 B2* | 12/2017 | Zelenack, Jr. | G01B 3/1041 |
| 2005/0051406 A1 | 3/2005 | Hopper | |
| 2008/0072443 A1* | 3/2008 | Powell | G01B 3/11 |
| | | | 33/503 |
| 2009/0127048 A1 | 5/2009 | Ichimura | |
| 2009/0313844 A1* | 12/2009 | Swanson | E04F 21/0076 |
| | | | 33/756 |
| 2010/0201970 A1* | 8/2010 | Pellen | G01B 11/26 |
| | | | 356/138 |
| 2011/0119936 A1 | 5/2011 | Swanson et al. | |
| 2012/0174683 A1* | 7/2012 | Kemnitz | G01L 1/242 |
| | | | 73/800 |
| 2018/0215573 A1* | 8/2018 | Tarasinski | B65H 57/14 |
| 2019/0074678 A1* | 3/2019 | Kegel | B65H 54/2854 |

FOREIGN PATENT DOCUMENTS

| | | |
|---|---|---|
| DE | 19526185 A1 | 1/1997 |
| DE | 19755094 A1 | 6/1999 |
| DE | 202006009750 U1 | 12/2007 |
| DE | 102011051052 A1 | 12/2012 |
| EP | 2053008 A1 | 4/2009 |
| JP | H0549134 A | 2/1993 |
| KR | 101204854 B1 | 11/2012 |

OTHER PUBLICATIONS

European Search Report issued in counterpart application No. 17201065.4 dated Jun. 29, 2018. (8 pages).

* cited by examiner

ARRANGEMENT FOR DETERMINING A SPATIAL ORIENTATION OF A LINE PORTION UNWOUND FROM A CABLE DRUM

RELATED APPLICATIONS

This application claims priority to German Application Ser. No. 102017201544.6, filed Jan. 31, 2017, the disclosure of which is hereby expressly incorporated by reference in its entirety.

FIELD OF THE DISCLOSURE

The present disclosure relates to an arrangement for determining a spatial orientation of a line portion unwound from a cable drum.

BACKGROUND

Different embodiments of a cable drum are used industrially for supplying movable or mobile systems with electrical energy. For this purpose, the cable drum is typically assigned to the movable or mobile system and includes an electric line which can be rolled up or unrolled, and of which the free end is connected to a stationary power-supply unit. The rolling-up and unrolling movement is controlled, for example, by means of an electromotive drum drive or winder drive, in accordance with the length of line which is required in each case. In the simplest scenario, instead of an electromotive drum drive or winder drive, use is made of a spring mechanism which pre-stresses the cable drum, and therefore the electric line, during the unwinding operation, and therefore said line is rolled up automatically as the tensile stressing eases off.

Such arrangements are known, for example, in heavy-duty cranes for supplying electricity to a crane truck which is guided in a movable manner along associated rails. Since the movement of the crane truck is securely predetermined, a defined rolling-up and unrolling movement of the electric line is ensured here. In contrast, the conditions in the case of mobile machinery, for example, of an electrically operated agricultural tractor are considerably more complex since the mobile machinery can move freely and, to this extent, it is not possible to rule out a situation where the path over which the vehicle travels crosses in an undesirable manner the unwound line portion lying on the ground. If the vehicle travels over the electric line, this can result in the latter being damaged or even destroyed.

In this disclosure, an arrangement is provided which makes it possible to define the progression, and therefore the position, of a line portion unwound from a cable drum.

SUMMARY

In one embodiment of the present disclosure, an arrangement for determining a spatial orientation of a line portion unwound from a cable drum includes a fastening base and a measuring probe which has a cable guide and can be pivoted cardanically in relation to the fastening base about a first and second axis of rotation, wherein the measuring probe interacts with a sensor device for sensing solid angles α, 13 which occur around the axes of rotation.

In other words, the measuring probe is constantly pivoted along by the electric line, which is located in the cable guide, in the direction of progression of said line, and this makes it possible to ascertain unequivocally the orientation of the line portion unwound from the cable drum. The axes of rotation may be oriented, in particular, such that the solid angles α, 13 which occur at the measuring probe represent a horizontal and vertical progression of the electric line, which exits at a cable outlet of the cable drum.

The cable drum is typically a constituent part of a piece of mobile machinery such as an electrically-operated agricultural tractor. The mobile machinery may have an electric wheel drive and various electrical operating devices for executing agricultural operating functions inter alia by means of an electrically operated add-on or auxiliary implement which can be fitted on said machinery.

The horizontal line progression determined makes it possible here, in dependence on the movement direction taken by the piece of mobile machinery, to evaluate whether the vehicle is possibly travelling over the unwound line portion or whether the electric line, in view of the movement direction taken, has to be rolled up or unrolled. Similar considerations apply to the vertical line progression determined, which makes it possible to ascertain excess sagging of the unwound line portion and, if appropriate, to reduce this sagging by specific rolling up of the electric line.

In general terms, it is the case here that the first axis of rotation runs such that the sensor device senses predominantly the direction which the electric line assumes relative to the piece of mobile machinery, and the second axis of rotation runs such that the sensor device senses predominantly sagging of the electric line.

The electric line is usually a multicore electric cable which, in addition to power-supply cores, can also have 30 cores for transmitting data signals and control signals.

The measuring probe has an actuating rod which can be pivoted cardanically in relation to the fastening base and at the free end of which the cable guide is fitted. The actuating rod thus forms a transmission element by means of which a change in position of the electric line sensed via the cable guide is transmitted mechanically to the sensor device.

It is also the case that the sensor device can have a first angle-of-rotation sensor and a second angle-of-rotation sensor, wherein the first angle-of-rotation sensor has its housing side fitted on the fastening base and its sensor side connected to a holder which can be pivoted about the first axis of rotation, and wherein the second angle-of-rotation sensor has its housing side fitted on the holder and its sensor side connected to the measuring probe, which can be pivoted about the second axis of rotation. The angle-of-rotation sensors are either (conductive-plastic) potentiometers with linear resistance characteristics, which make it possible to supply signal voltages proportional to the solid angles α, 13 sensed, or digital incremental encoders. The data signals therefrom are fed to a control unit for calculating the associated solid angles α, 13.

In order to ensure that the position of the unwound line portion is sensed precisely, it is possible for the cable guide to have a guide piece for accommodating an electric line in a form-fitting manner, and this therefore minimizes possible play of the electric line within the cable guide.

It is possible here for the guide piece to contain a cylindrical through-passage opening, which is surrounded by a plurality of guide rollers. It is usually the case that at least three guide rollers are distributed uniformly along the inner circumference of the cylindrical through-passage opening, and therefore the electric line passing through the guide piece is centered radially.

It is conceivable here for it to be the case that, along a mouth region on the inlet side or outlet side, the guide piece has a multiplicity of end-side slots, within which the guide rollers are accommodated in a rotatable manner. Since the slots are open in the outward direction on the end sides, straightforward installation of the guide rollers is ensured. The guide piece may be a cylindrical body made of plastic or metal.

In order to protect the electric line passing through the guide piece against possible damage, the guide rollers each have a running surface consisting of plastic or rubber.

According to an alternative configuration, it is also possible for the guide piece to be designed in the form of a slide bushing, in the simplest scenario in the form of a cylindrical body with a through-passage bore corresponding to the line diameter. The absence of moving parts means that such a slide bushing is distinguished by being particularly robust and durable.

It is precisely in the agricultural sector that the unwound line portion is exposed to increased levels of dirt. In order to keep the cable drum clean, or the electric line wound up thereon, a dirt scraper may be arranged in an outlet-side mouth region of the guide piece.

The arrangement according to the present disclosure may be a constituent part of a power-transmission and data-transmission system of a piece of mobile machinery having a cable drum with an electromotive drum drive or winder drive. The power-transmission and data-transmission system defines the length of line actually required by the piece of mobile machinery with reference to the spatial orientation determined for he unwound line portion, and therefore the line progression relative to the piece of mobile machinery, and adapts said length of line required for taking account of the current movement direction and speed of the piece of mobile machinery. For this purpose, the electromotive drum drive or winder drive is activated by means of a control unit, which belongs to the power-transmission and data-transmission system, such that (i) the unwound line portion is shortened, by virtue of the electric line being rolled up, when comparison of the determined line progression with the current movement direction of the piece of mobile machinery shows that the piece of mobile machinery and the unwound line portion are moving towards one another, and that (ii) said line portion is lengthened, by virtue of the electric line being unrolled, when comparison of the determined line progression with the current movement direction of the piece of mobile machinery shows that the piece of mobile machinery and the unwound line portion are moving apart from one another. The winding speed of the electromotive drum drive or winder drive is adapted here in each case in accordance with the current movement speed of the piece of mobile machinery.

The movement direction and speed of the piece of mobile machinery can be derived from the data signals from associated wheel-speed sensors or else from position-specific information from a GPS navigation system.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
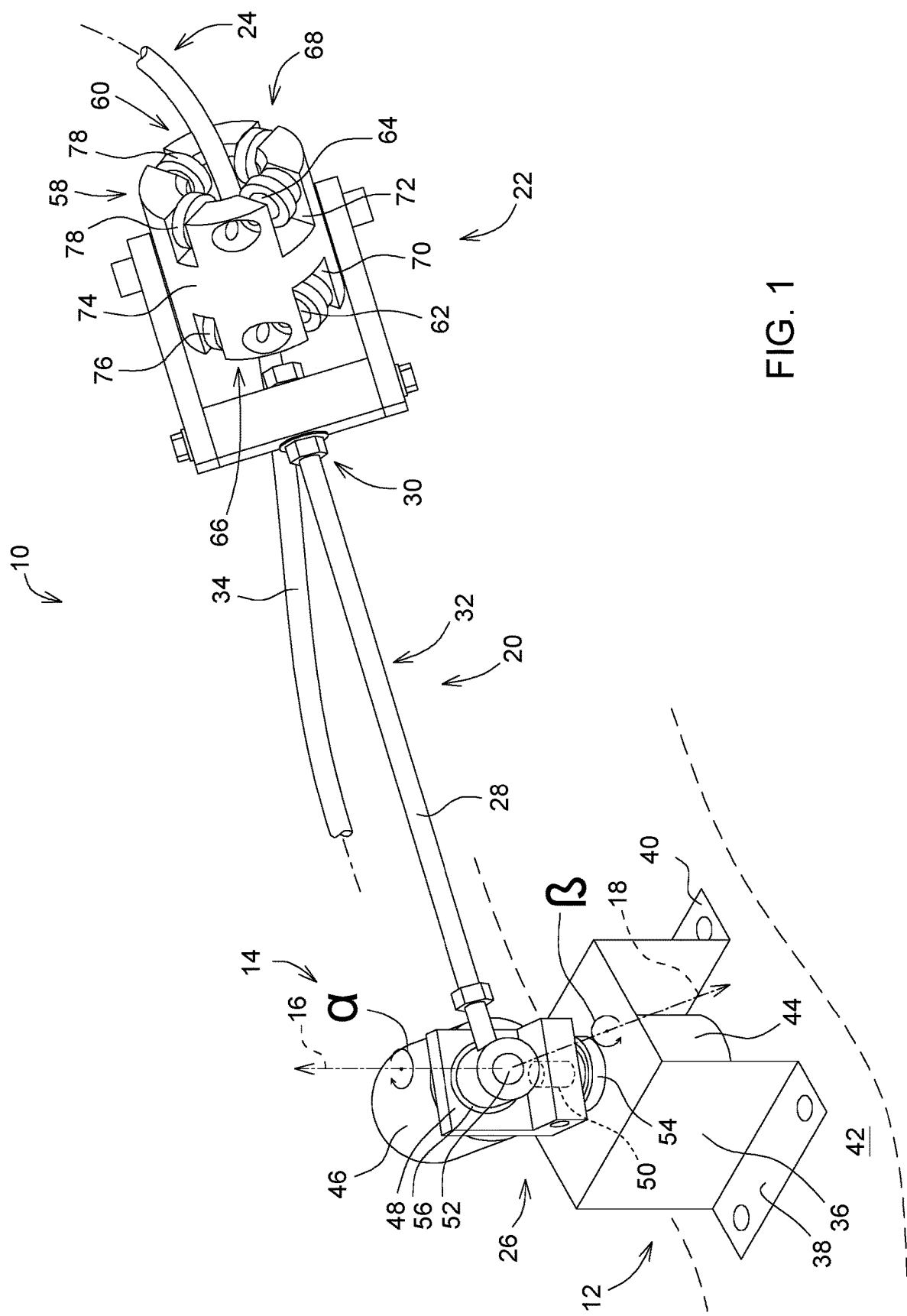
FIG. 1 shows an exemplary embodiment of the arrangement for determining a spatial orientation of a line portion unwound from a cable drum.

One embodiment of the present disclosure provides an arrangement for determining a spatial orientation of a line portion unwound from a cable drum. The arrangement 10 includes a fastening base 12 and a measuring probe 20 which has a cable guide 22 and can be pivoted cardanically in relation to the fastening base 12 by means of an associated joint arrangement 14 about a first and second axis of rotation 16, 18, a schematically indicated electric line 24 passing through said cable guide, wherein the measuring probe 20 follows the movement of the electric line 24.

The arrangement 10 also includes a sensor device 26, which can sense the spatial orientation or positioning of the measuring probe 20 in relation to the fastening base 12 about the two axes of rotation 16, 18. Each of the two axes of rotation 16, 18 here represents a certain solid angle $\alpha$, $\beta$ of the measuring probe 20 and therefore, ultimately, of the electric line 24 passing through the cable guide 22.

More specifically, the measuring probe 20 has an actuating rod 28 which can be pivoted cardanically in relation to the fastening base 12 and at the free end 30 of which the cable guide 22 is fitted. The actuating rod 28 forms a transmission element 32, by means of which a change in position of the electric line 24 sensed via the cable guide 22 is transmitted to the sensor device 26.

The electric line 24 is a multicore electric cable 34 which, in addition to power-supply cores, also has cores for transmitting data signals and control signals.

The fastening base 12, in this case, is designed in the form of a u-shaped bent sheet-metal part 36, which has two outwardly bent flanges 38, 40 for fastening on a supporting component 42. According to FIG. 2, the supporting component 42 is a chassis structure 90 belonging to a piece of mobile machinery 82.

The sensor device 26 has a first angle-of-rotation sensor 44 and a second angle-of-rotation sensor 46, wherein the first angle-of-rotation sensor 44 has its housing side fitted on the fastening base 12 and its sensor side connected to a holder 48 which can be pivoted about the first axis of rotation 16. The second angle-of-rotation sensor 46 has its housing side fitted on the holder 48 and its sensor side connected to the measuring probe 20, which can be pivoted about the second axis of rotation 18.

In the present case, the two angle-of-rotation sensors 44, 46 are supporting elements of the joint arrangement 14 with axes of rotation 16, 18 which are offset in relation to one another in each case, wherein the mechanical sensor pins 50, 52 of said angle-of-rotation sensors (the mechanical sensor pins coinciding with the axes of rotation 16, 18) are supported in relation to the fastening base 12 and the holder 48, respectively, by means of associated deep-groove ball bearings 54, 56. As a departure from this, it is also possible for the joint arrangement 14 to be designed in the form of a universal joint in which the two axes of rotation 16, 18 intersect at a common point (not illustrated).

The angle-of-rotation sensors 44, 46 are (conductive-plastic) potentiometers with linear resistance characteristics, which make it possible to supply signal voltages proportional to the solid angles $\alpha$, $\beta$ sensed. As an alternative, it is also possible for the angle-of-rotation sensors to be designed in the form of digital incremental encoders for generating corresponding data signals.

The cable guide 22 has a guide piece 58 for accommodating the electric line 24 in a form-fitting manner. The guide piece 58 contains a cylindrical through-passage opening 60, which is surrounded by a plurality of guide rollers 62, 64. For example, along a mouth region 66, 68 on the inlet side or outlet side, the guide piece 58 has a multiplicity of end-side slots 70, 72, within which four of the guide rollers 62, 64 are accommodated in a rotatable manner on each of the two sides. The guide rollers 62, 64 are distributed uniformly in each case along the inner circumference of the cylindrical through-passage opening 60, and therefore the electric line 24 passing through the guide piece 58 is centered radially. The guide piece 58 is a cylindrical body 74 made of plastic or metal.

In order to protect the electric line 24 passing through the guide piece 58 against possible damage, the guide rollers 62, 64 each have a running surface 76, 78 consisting of plastic or rubber.

Figure 2:
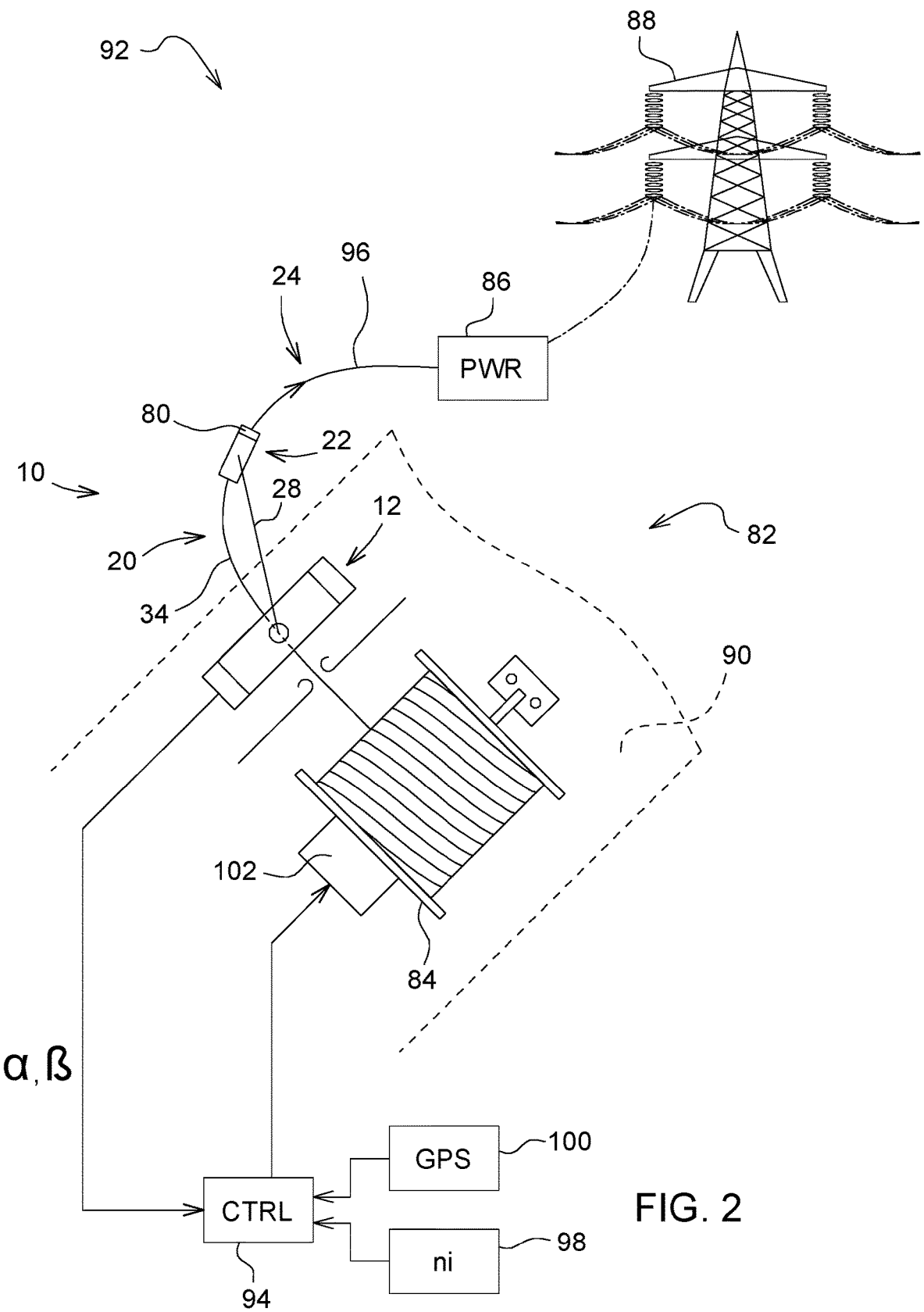
FIG. 2 shows a power-transmission and data-transmission system of a piece of mobile machinery having a cable drum with an electromotive drum drive or winder drive and having the arrangement of FIG. 1.

Furthermore, a dirt scraper 80, which is shown schematically in FIG. 2, is arranged in the outlet-side mouth region 68 of the guide piece 58.

According to an alternative configuration of the arrangement 10 which is not illustrated, the guide piece 58 is designed in the form of a slide bushing, in the simplest scenario in the form of a cylindrical body with a through-passage bore corresponding to the line diameter. The absence of moving parts means that such a slide bushing is distinguished by being particularly robust and durable.

In summary, the measuring probe 20, which interacts with the sensor device 26, is constantly pivoted along by the electric line 24 which is located in the cable guide 22 in the direction of progression of said line. This makes it possible to ascertain unequivocally the orientation of the line portion 96 unwound from the 10 cable drum 84 (see, in this respect, FIG. 2).

FIG. 2 shows a power-transmission and data-transmission system of a piece of mobile machinery having a cable drum with an electromotive drum drive or winder drive and having an arrangement according to FIG. 1. The piece of mobile machinery 82, which is depicted merely schematically, is an electrically operated agricultural tractor.

According to the example, the cable drum 84 is assigned to the piece of mobile machinery 82, wherein the electric line 24, which belongs to the cable drum 84, has its free end connected to a stationary power-supply unit 86, which for its part is fed with electric current from a high-voltage network 88.

The cable drum 84 here is installed, together with the arrangement 10, on a supporting chassis structure 90 of the piece of mobile machinery 82.

The power-transmission and data-transmission system 92 includes a microprocessor-controlled control unit 94, which is fed the signal voltages or data signals from the two angle-of-rotation sensors 44, 46 for determining the solid angles $\alpha$, $\beta$ and therefore the orientation of the line portion 96 unwound from the cable drum 84.

Also present are a plurality of wheel-speed sensors 98 for sensing wheel speeds of associated wheels of the piece of mobile machinery 82 or a GPS navigation system 100 for defining the current position of the piece of mobile machinery 82. The data signals supplied by the wheel-speed sensors 98 or the items of position-specific information supplied by the GPS navigation system 100 are transmitted to the control unit 94 so that the movement direction and speed of the piece of mobile machinery 82 can be derived therefrom.

The control unit 94 here defines the length of line actually required by the piece of mobile machinery 82 with reference to the spatial orientation determined for the unwound line portion 96, and therefore the line progression relative to the piece of mobile machinery 82, and adapts the length of line required while taking account of the current movement direction and speed of the piece of mobile machinery 82. For this purpose, the electromotive drum drive or winder drive 102 is activated by the control unit 94 such that (i) the unwound line portion 96 is shortened by virtue of the electric line 24 being rolled up, when comparison of the determined line progression with the current movement direction of the piece of mobile machinery 82 shows that the piece of mobile machinery 82 and the unwound line portion 96 are moving towards one another, and that (ii) the line portion is lengthened by virtue of the electric line 24 being unrolled, when comparison of the determined line progression with the current movement direction of the piece of mobile machinery 82 shows that the piece of mobile machinery 82 and the unwound line portion 96 are moving apart from one another. The winding speed of the electromotive drum drive or winder drive 102 is adapted here by the control unit 94 in each case in accordance with the current movement speed of the piece of mobile machinery 82.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An arrangement for determining a spatial orientation of a line portion unrolled from a cable drum, comprising:
   a fastening base; and
   a measuring probe comprising a cable guide and being pivotable in relation to the fastening base about a first and second axes of rotation;
   wherein the measuring probe is configured to interact with a sensor device, the sensor device configured to sense the first and second axes of rotation; and
   wherein the measuring probe comprises a fastening rod cardanically pivotable in relation to the fastening base and at a free end of which the cable guide is coupled.

2. An arrangement for determining a spatial orientation of a line portion unrolled from a cable drum, comprising:
   a fastening base; and
   a measuring probe comprising a cable guide and being pivotable in relation to the fastening base about a first and second axes of rotation;
   wherein:
   the measuring probe is configured to interact with a sensor device, the sensor device configured to sense the first and second axes of rotation,
   the sensor device comprises a first angle-of-rotation sensor and a second angle-of-rotation sensor,
   the first angle-of-rotation sensor comprises a housing side coupled on the fastening base and a sensor side connected to a holder, the holder being pivotable about the first axis of rotation, and
   the second angle-of-rotation sensor comprises a housing side coupled on the holder and a sensor side connected to the measuring probe and being pivotable about the second axis of rotation.

3. An arrangement for determining a spatial orientation of a line portion unrolled from a cable drum, comprising:

a fastening base;
a measuring probe comprising a cable guide and being pivotable in relation to the fastening base about a first and second axes of rotation;
wherein the measuring probe is configured to interact with a sensor device, the sensor device configured to sense the first and second axes of rotation;
wherein the cable guide comprises a guide piece for accommodating an electric line;
wherein the guide piece comprises a cylindrical through-passage opening surrounded by a plurality of guide rollers; and
wherein along a mouth region on an inlet side or outlet side, the guide piece comprises a plurality of end-side slots within which the guide rollers are rotatably accommodated.

4. The arrangement of claim 3, wherein the guide rollers each include a running surface formed of plastic or rubber.

5. The arrangement of claim 3, wherein the guide piece comprises a slide bushing.

6. The arrangement of claim 3, further comprising a dirt scraper arranged in an outlet-side mouth region of the guide piece.

7. A cable drum, comprising:
an arrangement for determining a spatial orientation of a line portion unrolled from the cable drum, the arrangement including a fastening base and a measuring probe;
wherein the measuring probe comprises a cable guide and is pivotable in relation to the fastening base about a first and second axes of rotation;
wherein the measuring probe is configured to interact with a sensor device, the sensor device configured to sense the first and second axes of rotation; and
wherein the measuring probe comprises a fastening rod cardanically pivotable in relation to the fastening base and at a free end of which the cable guide is coupled.

8. A cable drum, comprising:
an arrangement for determining a spatial orientation of a line portion unrolled from the cable drum, the arrangement including a fastening base and a measuring probe;
wherein:
the measuring probe comprises a cable guide and is pivotable in relation to the fastening base about a first and second axes of rotation,
the measuring probe is configured to interact with a sensor device, the sensor device configured to sense the first and second axes of rotation,
the sensor device comprises a first angle-of-rotation sensor and a second angle-of-rotation sensor,
the first angle-of-rotation sensor comprises a housing side coupled on the fastening base and a sensor side connected to a holder, the holder being pivotable about the first axis of rotation, and
the second angle-of-rotation sensor comprises a housing side coupled on the holder and a sensor side connected to the measuring probe and being pivotable about the second axis of rotation.

9. A cable drum, comprising:
an arrangement for determining a spatial orientation of a line portion unrolled from the cable drum, the arrangement including a fastening base and a measuring probe;
wherein the measuring probe comprises a cable guide and is pivotable in relation to the fastening base about a first and second axes of rotation;
wherein the measuring probe is configured to interact with a sensor device, the sensor device configured to sense the first and second axes of rotation;
wherein the cable guide comprises a guide piece for accommodating an electric line;
wherein the guide piece comprises a cylindrical through-passage opening surrounded by a plurality of guide rollers; and
wherein along a mouth region on an inlet side or outlet side, the guide piece comprises a plurality of end-side slots within which the guide rollers are rotatably accommodated.

10. The cable drum of claim 9, wherein the guide rollers each include a running surface formed of plastic or rubber.

11. The cable drum of claim 9, wherein the guide piece comprises a slide bushing.

12. The cable drum of claim 9, further comprising a dirt scraper arranged in an outlet-side mouth region of the guide piece.

13. A power-transmission and data-transmission system of an electrically operated agricultural tractor, comprising:
a cable drum; and
an arrangement for determining a spatial orientation of a line portion unrolled from the cable drum, the arrangement including a fastening base and a measuring probe;
wherein, the measuring probe comprises a cable guide and is pivotable in relation to the fastening base about a first and second axes of rotation;
wherein, the measuring probe is configured to interact with a sensor device, the sensor device configured to sense the first and second axes of rotation.

14. The system of claim 13, wherein the cable guide comprises a guide piece for accommodating an electric line.

15. The system of claim 13, wherein the measuring probe comprises a fastening rod cardanically pivotable in relation to the fastening base and at a free end of which the cable guide is coupled.

16. The system of claim 13, wherein:
the sensor device comprises a first angle-of-rotation sensor and a second angle-of-rotation sensor,
the first angle-of-rotation sensor comprises a housing side coupled on the fastening base and a sensor side connected to a holder, the holder being pivotable about the first axis of rotation, and
the second angle-of-rotation sensor comprises a housing side coupled on the holder and a sensor side connected to the measuring probe and being pivotable about the second axis of rotation.

17. The system of claim 13, wherein the cable guide comprises a guide piece for accommodating an electric line.

18. The system of claim 17, wherein the guide piece comprises a slide bushing.

19. The system of claim 17, further comprising a dirt scraper arranged in an outlet-side mouth region of the guide piece.

20. The system of claim 17, wherein the guide piece comprises a cylindrical through-passage opening surrounded by a plurality of guide rollers.

21. The system of claim 20, wherein along a mouth region on an inlet side or outlet side, the guide piece comprises a plurality of end-side slots within which the guide rollers are rotatably accommodated.

22. The system of claim 20, wherein the guide rollers each include a running surface formed of plastic or rubber.

* * * * *